(12) United States Patent
Sato

(10) Patent No.: US 7,574,061 B2
(45) Date of Patent: Aug. 11, 2009

(54) ENCODING DEVICE AND METHOD UTILIZING TABLE DATA FOR SELECTION OF BIT PLANES

(75) Inventor: Yutaka Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 564 days.

(21) Appl. No.: 10/252,335

(22) Filed: Sep. 23, 2002

(65) Prior Publication Data

US 2003/0081847 A1 May 1, 2003

(30) Foreign Application Priority Data

Sep. 25, 2001 (JP) .............................. 2001-292582

(51) Int. Cl.
*G06K 9/36* (2006.01)
*G06K 9/46* (2006.01)

(52) U.S. Cl. ...................... 382/239; 382/240

(58) Field of Classification Search .................. 382/240
See application file for complete search history.

(56) References Cited

U.S. PATENT DOCUMENTS

| | | | | |
|---|---|---|---|---|
| 5,600,373 A * | 2/1997 | Chui et al. | ............. | 375/240.1 |
| 6,212,233 B1 * | 4/2001 | Alexandre et al. | ..... | 375/240.03 |
| 6,266,338 B1 * | 7/2001 | Simon et al. | ............. | 370/412 |
| 6,339,616 B1 * | 1/2002 | Kovalev | ............. | 375/240.16 |
| 6,351,491 B1 * | 2/2002 | Lee et al. | ............. | 375/240.03 |
| 6,711,299 B2 * | 3/2004 | Chao et al. | ............. | 382/240 |
| 6,792,153 B1 | 9/2004 | Tsujii | | |
| 6,876,772 B2 * | 4/2005 | Fukuhara et al. | ............. | 382/240 |
| 6,898,325 B2 * | 5/2005 | Gormish | ............. | 382/248 |
| 6,934,418 B2 * | 8/2005 | Okada | ............. | 382/240 |
| 6,993,199 B2 * | 1/2006 | Chebil | ............. | 382/240 |
| 2001/0046324 A1 * | 11/2001 | Bouchard et al. | ............. | 382/232 |

FOREIGN PATENT DOCUMENTS

| | | |
|---|---|---|
| JP | 2001-145105 | 5/2001 |
| JP | 2001-204030 | 7/2001 |

OTHER PUBLICATIONS

Dec. 11, 2007 Japanese official action in connection with corresponding Japanese application No. 2001-292582.

* cited by examiner

*Primary Examiner*—Matthew C Bella
*Assistant Examiner*—Yuzhen Ge
(74) *Attorney, Agent, or Firm*—Cooper & Dunham, LLP

(57) ABSTRACT

An encoding process is provided which can easily control the compression rate or guarantee a maximum required processing time when representing the factor data, obtained from a wavelet transformation, as codes corresponding to each of the bit planes. To this end, a plurality of sets of table data each specifying the bit planes to be discarded for each of the sub bands are provided, and by selecting one of these sets according to the various conditions set forth such as the desired compression rate or a maximum required processing time, the amount of data to be encoded can be optionally set and/or a maximum required processing time can be optionally set for an apparatus with a predetermined processing speed.

17 Claims, 11 Drawing Sheets

| TABLE NO | CODE QUANTITY |
|---|---|
| 0 | q0 BYTE |
| 1 | q1 BYTE |
| 2 | q2 BYTE |
| 3 | q3 BYTE |
| 4 | q4 BYTE |
| 5 | q5 BYTE |
| 6 | q6 BYTE |
| 7 | q7 BYTE |

FIG.12

| | 2LL | 2HL | 2LH | 2HH | 1HL | 1LH | 1HH | AMOUNT OF DATA TO BE ENCODED |
|---|---|---|---|---|---|---|---|---|
| NUMBER OF DATA (D) | 1 | 1 | 1 | 1 | 4 | 4 | 4 | |
| NUMBER OF ZERO BIT PLANES (Z) | 1 | 1 | 2 | 2 | 3 | 2 | 3 | |
| NUMBER OF BIT PLANES TO BE ENCODED IN LOSSLESS ENCODING (P) | 6 | 6 | 5 | 5 | 4 | 6 | 5 | 34 |
| NUMBER OF BIT PLANES TO BE PROCESSED WHEN USING TABLE 0 | 5 | 4 | 3 | 2 | 1 | 3 | 1 | 38 |
| NUMBER OF BIT PLANES TO BE PROCESSED WHEN USING TABLE 1 | 6 | 5 | 4 | 3 | 1 | 3 | 1 | |
| NUMBER OF BIT PLANES TO BE PROCESSED WHEN USING TABLE 3 | 6 | 5 | 4 | 3 | 2 | 4 | 2 | 50 |
| NUMBER OF BIT PLANES TO BE PROCESSED WHEN USING TABLE 6 | 6 | 6 | 5 | 5 | 4 | 6 | 4 | 78 |
| NUMBER OF BIT PLANES TO BE PROCESSED WHEN USING TABLE 7 | 6 | 6 | 5 | 5 | 4 | 6 | 5 | 82 |

ENCODING DEVICE AND METHOD UTILIZING TABLE DATA FOR SELECTION OF BIT PLANES

BACKGROUND

The present invention disclosure generally relates to an encoding method for image compression, and particularly, to a method which can be configured for improving the efficiency of the encoding method corresponding to the next-generation international standard "JPEG-2000", which is a compression method for still images.

In recent years, various techniques have been developed in an attempt to improve the efficiency of the image storage process in the field of image recording, concerning such devices as the digital still camera, the recording component of the digital copier, the surveillance camera, the digital video storage, the digital camera (for recording moving images), etc. In particular, JPEG-2000 is being widely acknowledged as the next-generation technology succeeding JPEG (Joint Photographic Experts Group), which is the current mainstream technology in this field.

FIG. 1 shows a flow chart of an encoding process according to the JPEG-2000 standard. FIGS. 2 and 3 show exemplary outlines of the process performed in the individual steps of FIG. 1.

In the first step of FIG. 1, a multi-leveled two dimensional discrete wavelet transformation (DWT) is performed on the input image data (101).

Upon performing the encoding process, the data image to be processed can be divided into a plurality of rectangular blocks called tiles, as shown in FIG. 2. If the data image is divided into a plurality of tiles, each of the ensuing processes; namely, the two dimensional discrete wavelet transformation (DWT) process, the quantization process, and the entropy encoding process will be performed on each of the individual tile units.

FIG. 2 illustrates the DWT process in a case where the image data are divided into tiles each having dimensions of 128×128 pixels, and where the two dimensional discrete wavelet transformation at level 2 is performed on the image data of each of the tiles divided accordingly.

By means of the two dimensional discrete wavelet transformation at level 2, the image data of the 128×128 pixels tiles are transformed into wavelet coefficient data from the four sub bands 2LL, 2HL, 2LH and 2HH each having dimensions of 32×32 pixels, and the three sub bands 1HL, 1LH and 1HH each having dimensions of 64×64 pixels.

In the JPEG-2000 standard, two coefficients, lossless and lossy, are standardized as the filter coefficients of the wavelet transformation. More specifically, the lossless coefficient is used when handling the lossless and lossy coefficients together, and the lossy coefficient is used when a higher compression rate or distortion characteristic is to be realized.

The next process is to perform a scalar quantization to the obtained wavelet coefficient data based on the following equation (102):

$$q = \mathrm{sign}(a) \times \lfloor |a|/\Delta b \rfloor$$

Referring to the above equation, sign(a) represents a code for the wavelet coefficient data (a); |a| represents the absolute value of (a); Δb represents the quantization step determined for each sub band; and $\lfloor\ \rfloor$ represents a floor function. However, this scalar quantization is not performed when the lossless wavelet coefficient is used.

Following the above-described wavelet transformation, or the quantization process, an entropy encoding process is performed on the coefficient data obtained therefrom, on each of the sub bands, or on each of the code blocks, which are rectangular areas that further subdivide the sub band.

As shown in FIG. 1, this entropy encoding process comprises a step of coefficient modeling for generating context to be provided to the later-described two-value arithmetic encoder (104) from the above coefficient data, and a step of actually performing the encoding process by means of the arithmetic encoder (104).

The specific procedures of this process are described below.

① Transform the coefficient data of a sub band or code block into (code)+(absolute value).

In this case, the absolute value of the coefficient is divided into bit planes for each bit of the coefficient, and the entropy encoding process is performed for each bit plane starting with the bit plane on the MSB side.

FIG. 3 illustrates, as an example, how the absolute value of the coefficient of the sub band 2LL is divided into bit planes (zero bit planes, bit plane N, bit plane N−1, . . . , bit plane 1, bit plane 0) for each bit corresponding to each pixel.

② Furthermore, among the above bit planes, the planes from the top just until the plane representing a valid bit (a bit other than 0) are called the zero bit planes and the entropy encoding process is not performed on these planes. The entropy encoding process starts at the first bit plane that indicates a bit other than 0 (bit plane N, in the case of FIG. 3).

In the example of FIG. 3, the top two bit planes are zero bit planes, and a bit other than 0 appears for the first time at the third bit plane. The entropy encoding process starts from the above bit plane N and is performed for N+1 bit planes until reaching bit plane 0.

③ For the bit planes that forgo the entropy encoding process, each bit plane is normally scanned 3 times in order to be encoded. The scanning process for encoding the bit plane is called a coding pass and each pass is referred to as follows:
1) significance propagation pass
2) magnitude refinement pass
3) cleanup pass Each bit on the bit plane is classified according to a certain rule, and the bit plane is encoded in one of the above passes using the context generated from the states of the bits surrounding the respective bit.

Specifically, as shown in FIG. 3, the bit plane N, which is the first plane to be encoded, is processed only in the cleanup pass. The ensuing bit planes are each encoded using the above 3 coding passes. Thus, for N+1 bit planes, the encoding process is performed by a total of 3N+1 passes.

④ Next, an entropy code is generated in the arithmetic encoder (104) using the encoded bits generated from each of the above passes and their corresponding context.

The entropy codes (MQ code) generated in this way are put together in the final code formation step (105) shown in FIG. 1 to produce a JPEG-200 bit stream.

In the code formation process (105), the codes generated from each pass in the arithmetic encoder (104) are put together for every set of passes, such sets being referred to as layers.

FIG. 4 illustrates a process in which the codes generated in the arithmetic encoder for 3N+1 passes are put together into L+1 layers from layer 1 to layer L. In this drawing, bit data and its corresponding context data necessary for the encoding process are selected and input to the arithmetic encoder by the multiplexer based on the above coefficient data, and the codes for each bit plane and each coding pass are generated by the arithmetic encoder after which each of the codes obtained thusly are put together into layers.

Further, as shown in FIG. 5, the codes assembled together for each sub band and each layer are arranged to produce a final bit stream. Here, the set of each sub band and each layer is called a packet, and each packet comprises a packet header for indicating the respective packet information, and the above-described entropy codes produced at the arithmetic encoder.

The above is a description of an encoding process for input image data that is monochrome. For encoding an image with multi-colors (components) such as an RGB image, the packets of each sub band and each layer are produced for each color (component) in a similar fashion, and the JPEG-2000 bit stream is obtained by arranging these packets in the established order (FIG. 6).

FIG. 6 illustrates an example of the encoding process in which an image with 3 colors (component 0, 1, and 2) is encoded into a JPEG-2000 bit stream.

The encoding process in accordance with the JPEG-2000 standard is characterized in that once the bit stream is encoded, it can be recompressed to obtain the necessary compression rate in its encoded state without having to decode said bit stream.

This is due to the fact that the code for the JPEG-2000 standard comprises a set of codes for each component (color component), each sub band (resolution), and each layer. Thus, for example, in a case where an encoding process is performed only to find out later on that the compression rate of the encoded image does not satisfy the desired compression rate, the encoded data are discarded in due order starting with the packet that has the lowest priority. As a result, an operation of raising the compression rate can be performed with relatively little degradation of the image quality.

The code shown in FIG. 6 is lossless code. Code that is further compressed from the code of FIG. 6 (with a raised compression rate) can be obtained (recompression), as shown in FIG. 7, by discarding the packets of the layers L with the sub bands 1HL, 1LH and 1HH, for each of the different components in FIG. 6, this being a lossy code.

However, in the above-described recompression, the codes of the predetermined packets can be discarded only when the encoding process is completed for an entire picture (for example, one image) after which the breaks in the codes of each of the packets are determined. Therefore, some time will be required for the determination process and the like, and this can be a problem in an encoding process requiring high speed such as in encoding a moving image.

SUMMARY

In an aspect of the present disclosure, a method for efficiently controlling the compression rate and the code quantity during the encoding operation so that it can be used in an encoding process that requires high speed such as the encoding of a moving image.

The encoding method according to the JPEG-2000 standard performs the wavelet transformation on image data as described above, and then performs the entropy encoding process on its coefficient data for each bit plane. On the other hand, in the approach proposed in this disclosure, the number of zero bit planes after the wavelet transformation may vary depending on the image, meaning the number of bit planes that are to be encoded may vary. Thus, if the processing speed of the arithmetic encoder is fixed, the processing time required for the encoding process will vary depending on the image, which means that the encoding process may fail to satisfy the conditions, for example, of encoding a moving image which sets a time limit at 30 frames per second.

In another aspect of the present disclosure, a method of controlling the encoding process is provided so that it is performed within a predetermined processing time period, applicable even in high-speed encoding processes for moving images and the like.

Further, in another aspect of the present disclosure, an encoding method is provided which is capable of performing both the above-described code quantity control and encoding process time control at the same time in the same apparatus.

For example, in the encoding process of representing image data with a plurality of bit planes for each sub band and encoding said image data for each bit plane, a plurality of pre-established table data sets for determining either the bit plane to be discarded or the bit plane to be encoded can be provided, wherein each type of the table data sets corresponds to each of the various conditions from a case where the amount of data to be encoded is large to a case where it is small, and a table data set is selected according to various conditions set forth in each encoding process.

The above-mentioned various conditions may correspond to the desired compression rate, or a maximum required processing time. By selecting a table data, set in accordance with these conditions, the compression rate can be optionally and easily controlled, or in the case of compressing a moving image or the like, a maximum required processing time can be easily guaranteed. In this way, real-time image processing can be realized. Further, it is also possible to simultaneously control the compression rate and guarantee a maximum required processing time.

DESCRIPTION OF THE PREFERRED EMBODIMENTS

In the following, a description of the preferred embodiments of the present invention is given with reference to the accompanying drawings.

In the present invention, the number of bit planes on which the entropy process will be performed, for each of the components and for each of the sub bands, or the number of coding passes to be performed, is determined according to pre-established table data. Thus, the amount of codes generated in the final result is controlled. An example of such table data is shown in FIG. 8.

Figure 8:
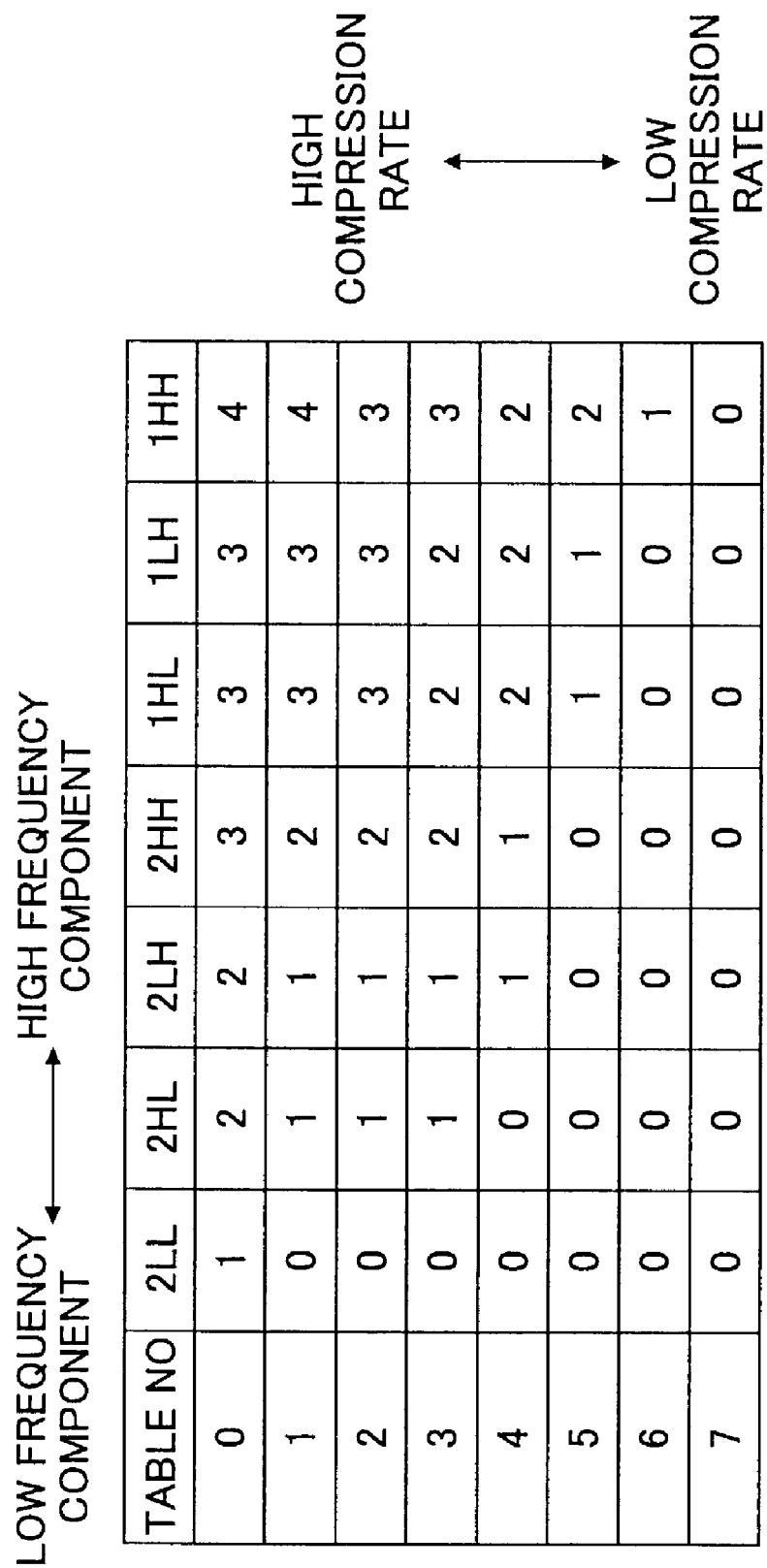
FIG. 8 illustrates the table data used in an embodiment of the present invention.

In the example of FIG. 8, tables (sets) 0 through 7 are provided, and each table indicates the number of bit planes to be discarded in each sub band counting from the LSB plane. For example, if the table 3 is selected from the above table data, all the bit planes except for the zero bit planes will be encoded for the sub band 2LL; all the bit planes except for the zero bit planes and the least significant bit plane will be encoded for the sub bands 2HL and 2LH; all the bit planes except for the zero bit planes plus the two bit planes counting from the least significant bit plane will be encoded for the sub bands 2HH, 1HL and 1LH; and all the bit planes except for the zero bit planes plus the three bit planes counting from the least significant bit plane will be encoded for the sub band 1HH.

Figure 9:
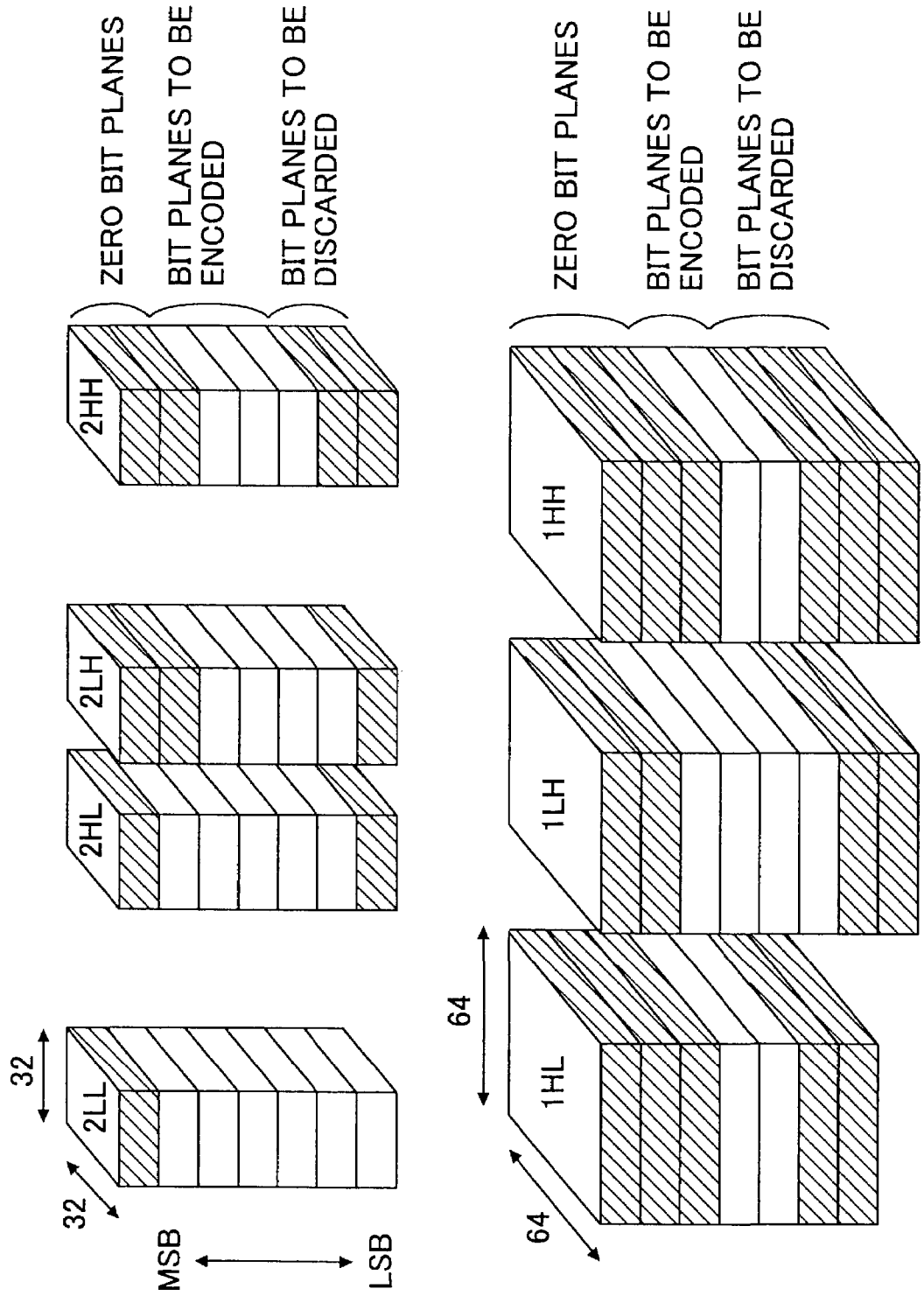
FIG. 9 is an exemplary diagram showing the bit planes to be discarded among the bit planes of each sub band.

FIG. 9 describes the above case (the case where table 3 is selected) in further detail.

As shown in this diagram, the number of zero bit planes varies for each sub band depending on the image; however, it is possible to control the amount of codes generated from the arithmetic encoder (104) by specifying the number of bit planes to be discarded If the table 7 is selected in the exemplary table data of FIG. 8, all the bit planes will be encoded except for the zero bit planes, resulting in a lossless encoding process. As the table numbers go down, or as we move upward in the chart of FIG. 8, from table 7 to table 6, 5, 4, . . . and so on, the number of bit planes to be discarded increases, resulting in a higher compression rate. Also, as we shift to the right in the table of FIG. 8, or as we move on to the sub bands with a higher frequency, the number of bit planes to be discarded increases. By structuring the table data in this way, the compression rate can be increased with relatively little degradation of the image quality.

In the above description, an example of encoding a monochrome image is given; however, a multi-color (component) image may also be encoded in a similar fashion using the same table data in order to control the amount of codes generated as a result. In this case, the table data may be provided individually for each of the (color) components, or the process may otherwise be controlled using common table data.

Figure 1:
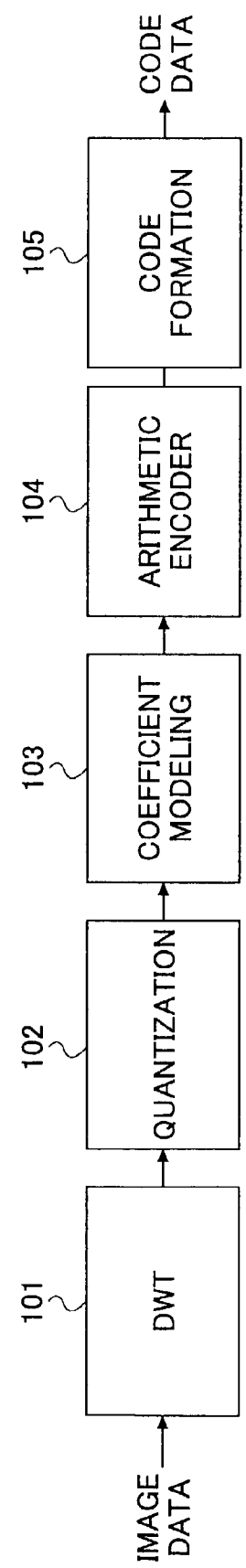
FIG. 1 shows an exemplary process chart of the encoding process according to the JPEG-2000 standard, to which the present invention can be applied.
Figure 2:
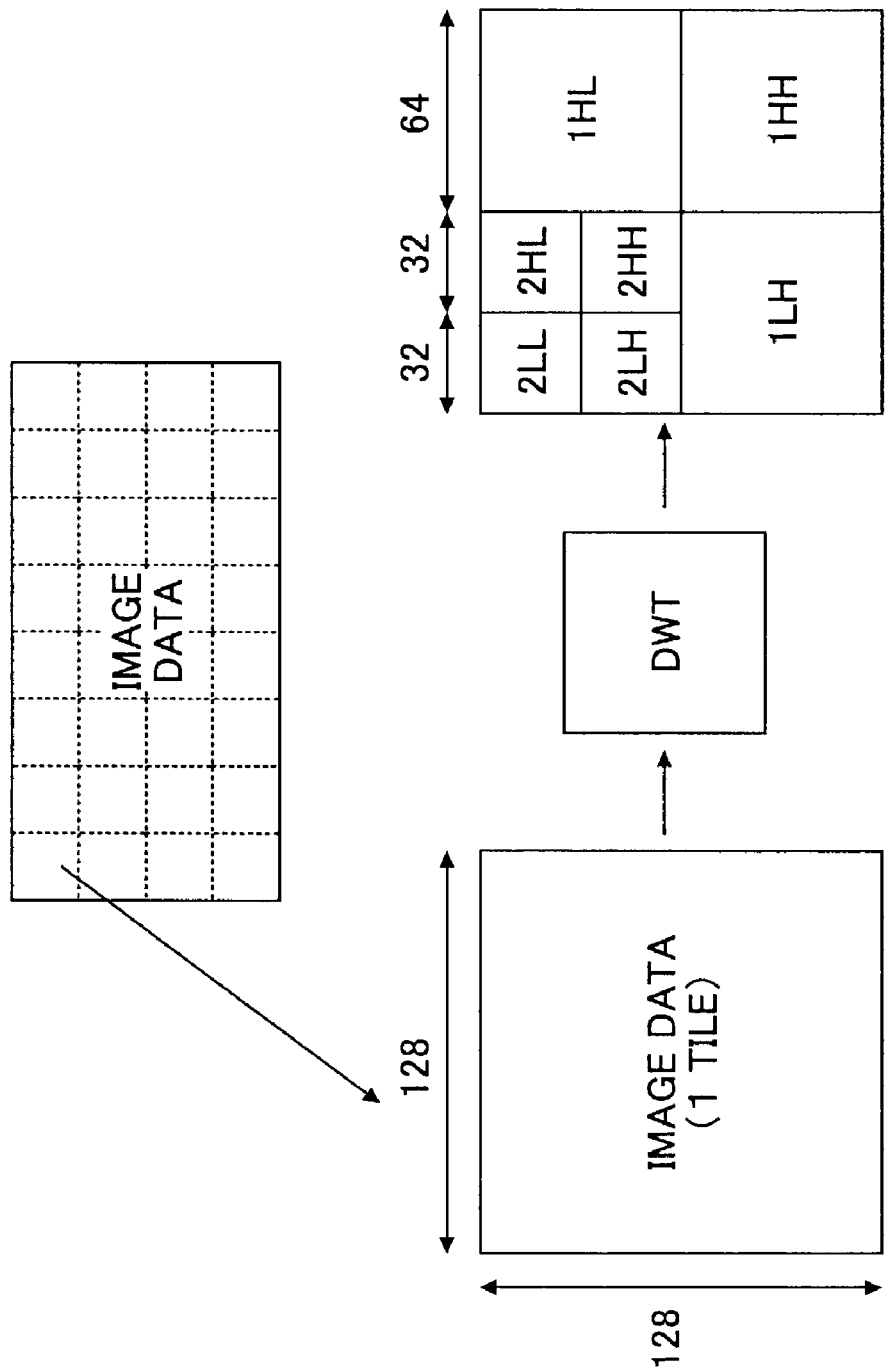
FIG. 2 is a diagram illustrating the wavelet transformation process of the encoding process in FIG. 1.
Figure 3:
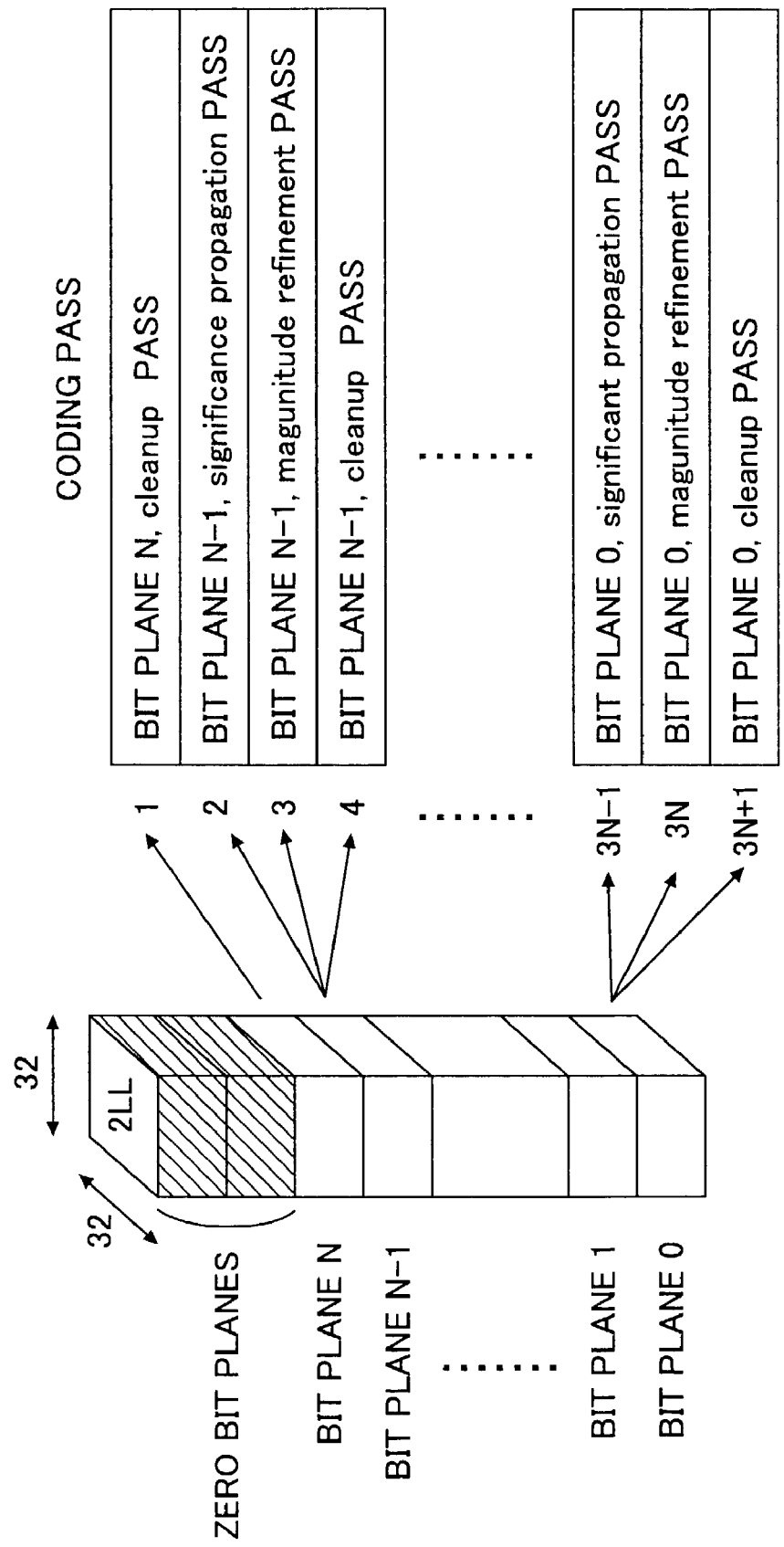
FIG. 3 is a diagram illustrating the concept of bit planes in the encoding process of FIG. 1.
Figure 4:
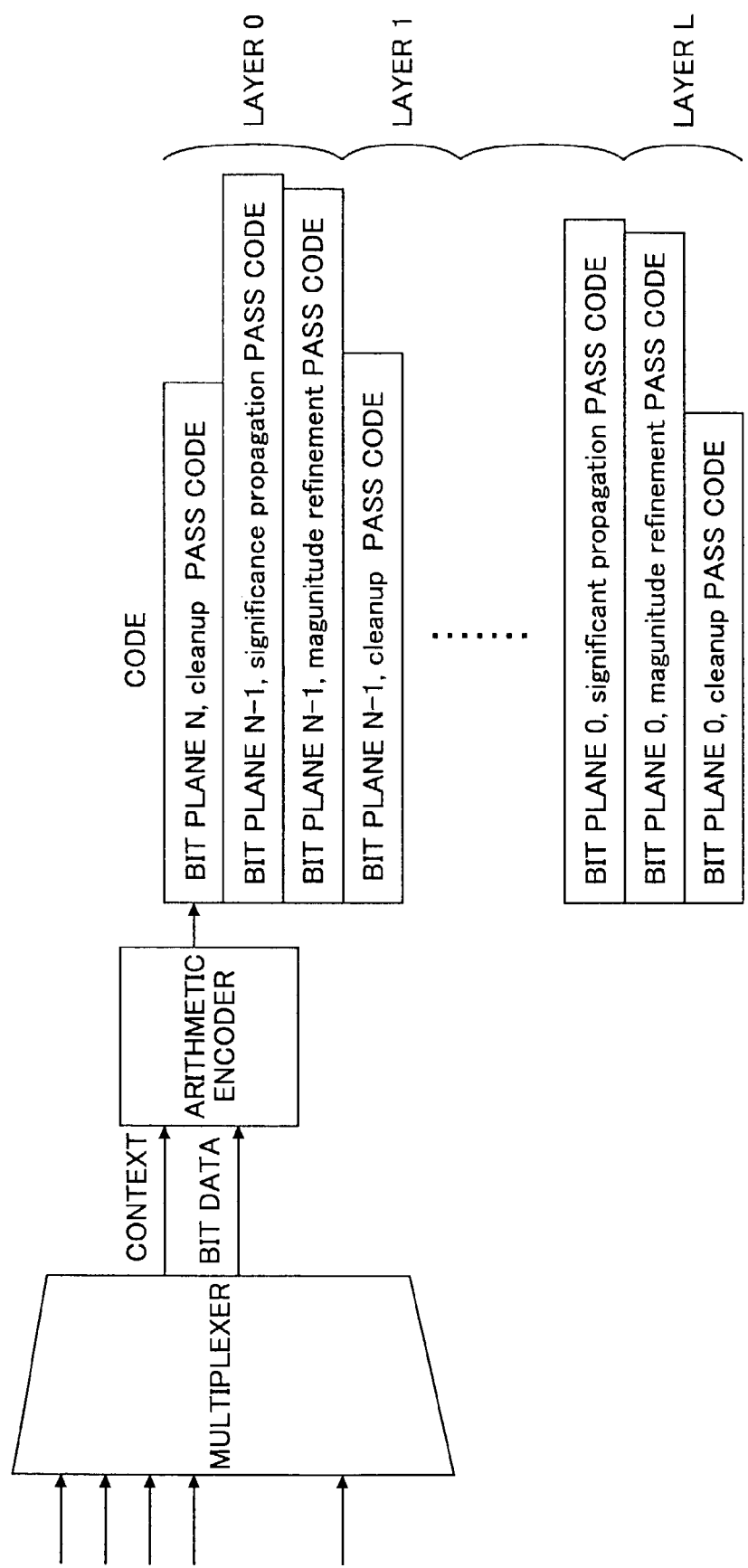
FIG. 4 is a diagram illustrating the process of grouping the codes obtained in the arithmetic encoder into each layer, in the encoding process of FIG. 1.
Figure 5:
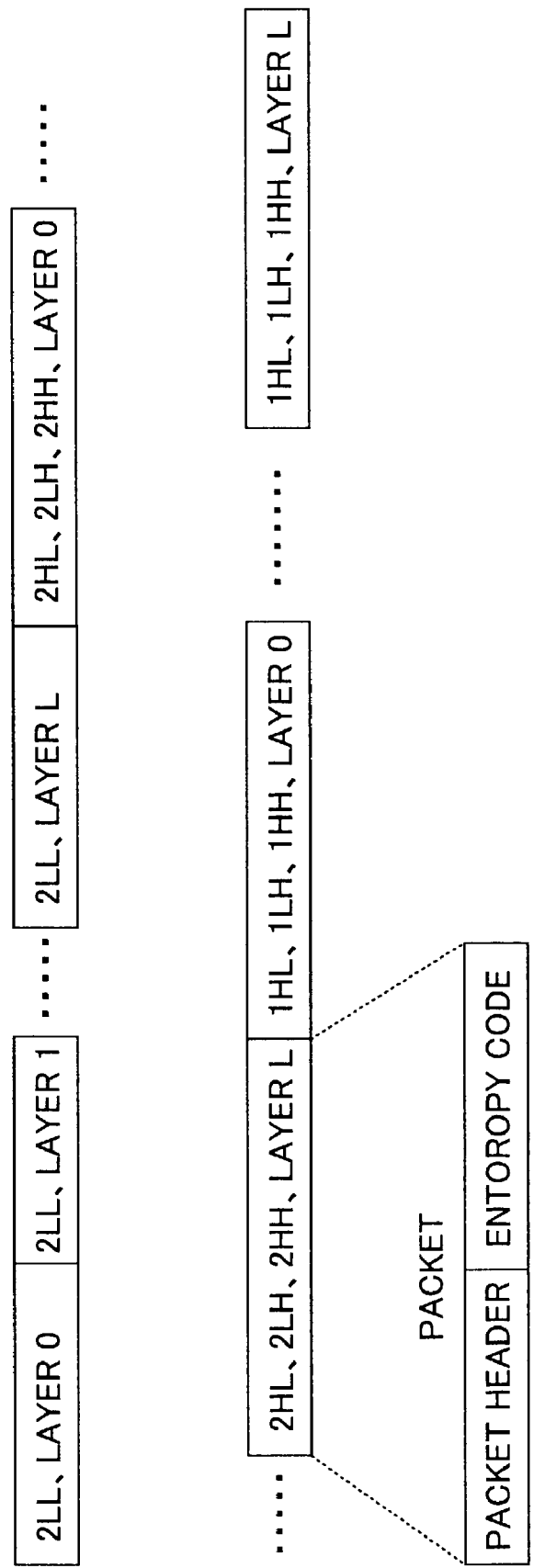
FIG. 5 is a diagram illustrating the concept of a bit stream formed by packets that group each of the sub bands and each of the layers, in the encoding process of FIG. 1.
Figure 6:
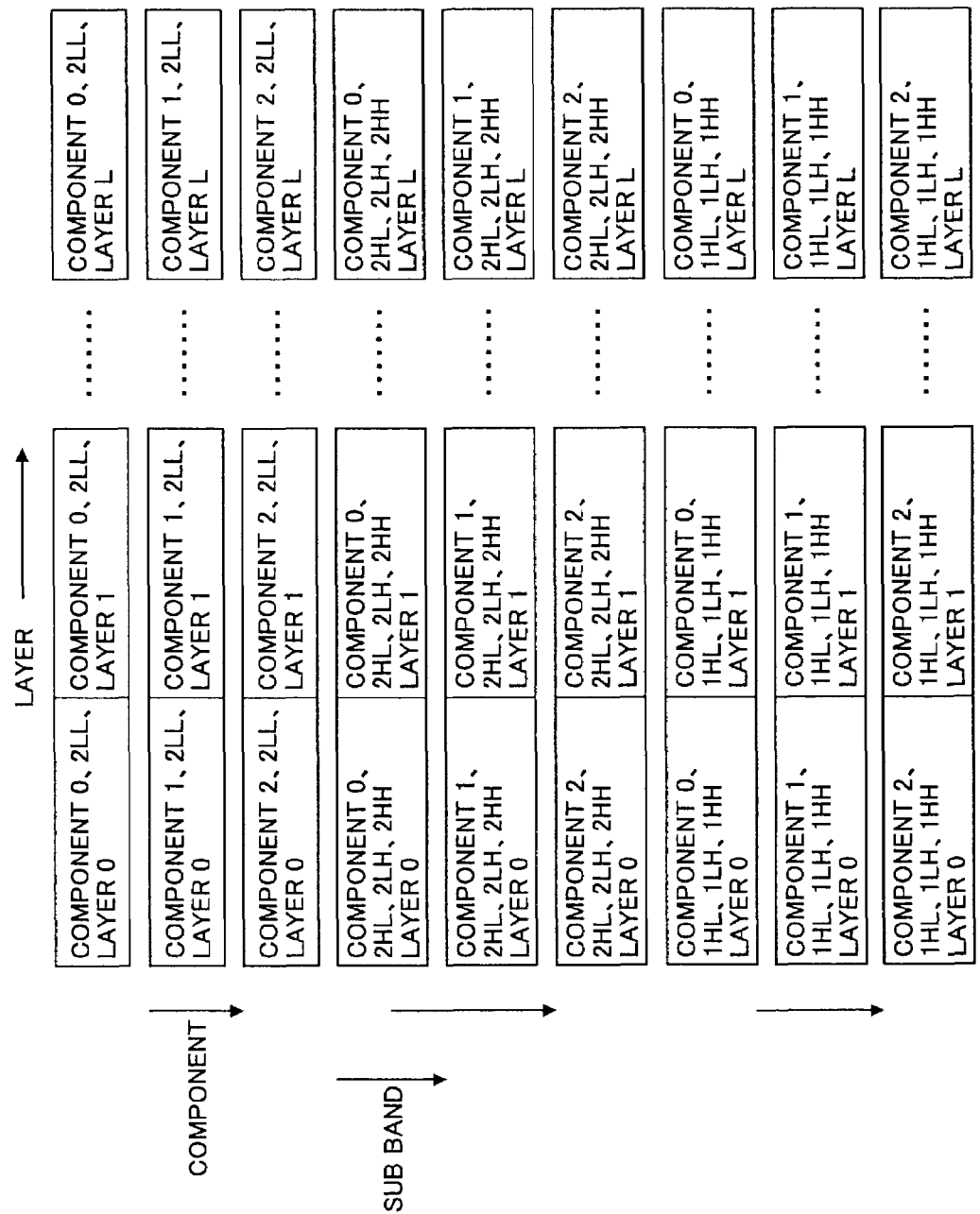
FIG. 6 illustrates the bit stream of FIG. 5 wherein the codes for each color component and each sub band are displayed in order.
Figure 7:
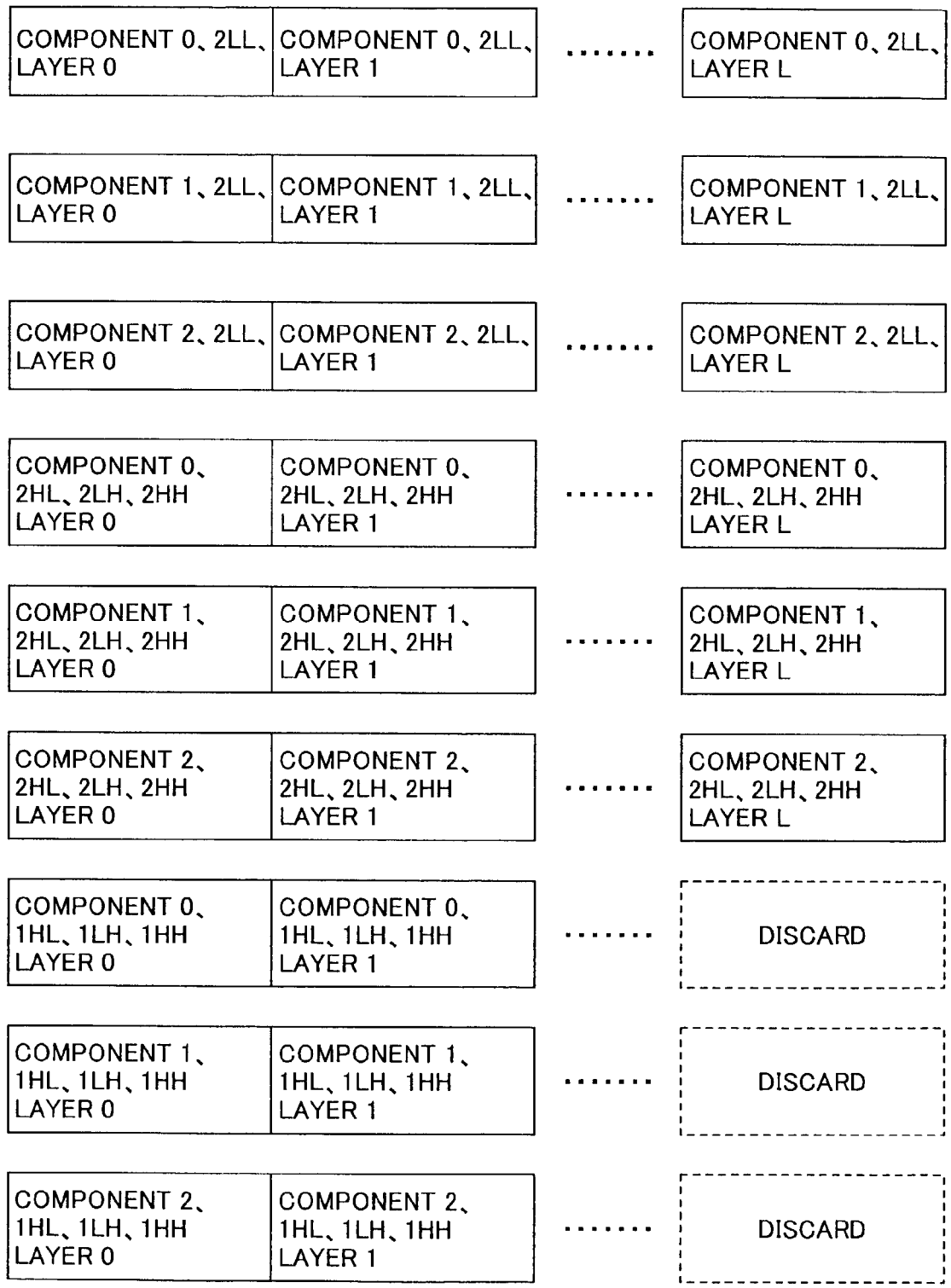
FIG. 7 illustrates the execution of a lossy compression on the bit stream of FIG. 6.

In the table data shown in FIG. 8, the number of bit planes to be discarded is specified; however, the number of bit planes to be encoded, aside from the zero bit planes, may be specified instead. Also, the number of the previously described coding passes of the encoding process (refer to FIG. 3) may also be specified (controlled), enabling a further detailed adjustment of the amount of codes to be generated.

Now, the methods for selecting a table data set from the plurality of table data sets provided as previously will be described.

The first method is to encode an image using a suitable table data set, and to select a table data set of a smaller table number (increasing the compression rate), if the compression rate obtained from the above encoding process does not satisfy the desired compression rate, so as to re-encode the image once more.

In this case, for example, the table 7 may first be used in the encoding process of FIG. 8 to perform a lossless compression, and along with the encoding process, code quantity values of the codes to be generated in each of the bit planes indicated in the table may be kept as reference data. Thus, the code quantity that is to be expected from complying with each of the tables 0 through 7 in the encoding process can be calculated by multiplying the number of bit planes to be encoded in each case by the above code quantity for each bit plane, as indicated in FIG. 10, and by referring to this data, the table (set) that will bring the optimum compression rate can be selected for the second encoding process.

In the example described above, an image is encoded at least twice, which requires a fair amount of time and effort. Accordingly, in encoding moving images and the like, a different embodiment my be used, wherein the first frame is encoded using a suitable table, and the second frame is encoded, using a table that further increases the compression rate when the compression rate of the previous frame is worse than expected, or using either the same table as the previous frame or a table that further increases the code quantity when the compression rate of the previous frame is better than expected. In this way, a real-time encoding process may be performed.

Figures 10, 11:
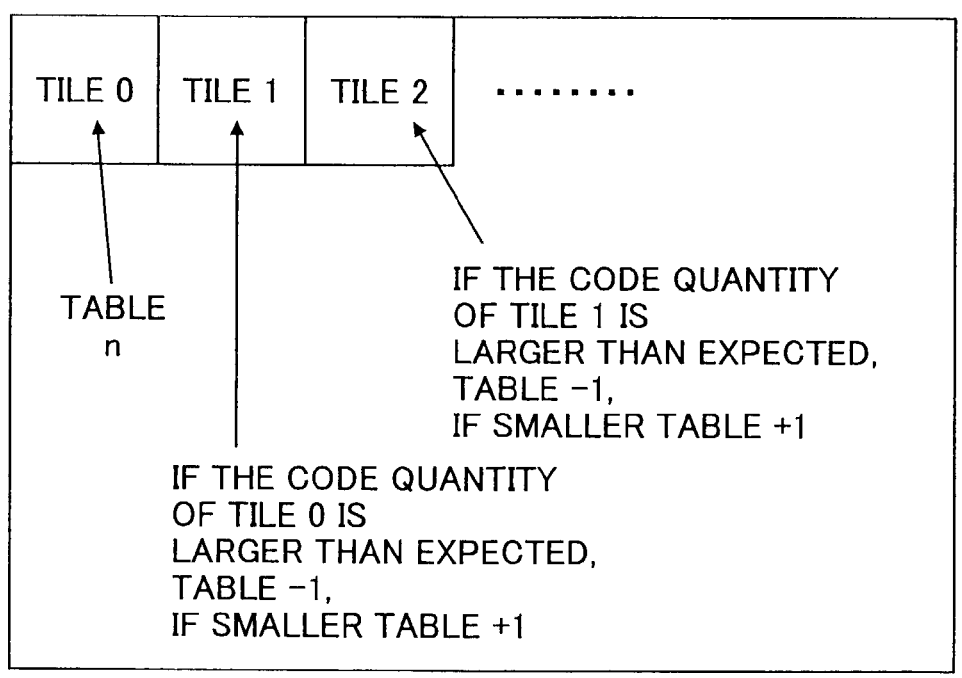
FIG. 10 shows an example of the amount of data that is to be encoded for each of the tables (sets) in the table data of FIG. 8.
FIG. 11 is a diagram illustrating how the present invention is applied in the encoding process of an image divided into tiles; and, FIG. 12 is a chart for illustrating an example of how the amount of data to be encoded is calculated for each of the tables (sets) in the table data of FIG. 8, in the encoding process according to an embodiment of the present invention.

Further, as shown in FIG. 11, in the previously mentioned case where the encoding process is performed on an image that is divided into a plurality of tiles, the above process on each frame may be performed on each of the tiles based on the code quantity of the previously encoded tile, in determining the table that will be used for encoding the next tile.

Now, a method of confining the encoding process time within a predetermined time period is described with reference to FIG. 12. Here, it is assumed that table data identical to that of the previous descriptions is used.

First of all, the number of zero bit planes for each of the sub bands becomes certain at the moment the wavelet transformation (101) is completed. Here it is supposed that the resulting numbers are: 1 bit plane for 2LL; 1 bit plane for 2HL; 2 bit planes for 2LH; . . . and so on, as indicated in the 'number of zero bit planes (Z)' in FIG. 12 (corresponding to the example illustrated in FIG. 9).

Further, since the number of bits in the coefficient data obtained from the wavelet transformation is available, the number of bit planes that will be encoded for each sub band upon a lossless encoding process can be calculated by subtracting the number of bits corresponding to the zero bit planes from the above total number. In the example of FIG. 12, the number of bit planes (P) to be encoded in a lossless encoding process is indicated.

If it is supposed that the table 0 of the table data in FIG. 8 is used, the number of bit planes to be encoded for each of the sub bands is calculated to get, for example: 6−1=5 bit planes for the sub band 2LL, since 1 bit plane will be discarded; 6−2=4 sub bands for 2HL, since 2 bits will be discarded; . . . and so on. These results are indicated in FIG. 12 as the 'number of bit planes to be processed when using table 0'.

Here, it should be noted that the data quantity of the coefficient data for each sub band varies. As shown in FIG. 9, each of the sub bands 2LL, 2HL, 2LH and 2HH contains coefficient data for 32×32 pixels, whereas each of the sub bands 1HL, 1LH and 1HH contains coefficient data for 64×64 pixels. In the following descriptions, the amount of data for 32×32 pixels is represented as one unit for convenience's sake. As indicated in the 'number of data (D)' in FIG. 12, the amount of data of the coefficient data for each of the sub bands is, 1, 1, 1, 1, 4, 4, 4, respectively.

As shown below, the amount of data that is to be encoded when using the table 0 is obtained as 34 (provided the 32×32 pixels represents one unit) from the number of bit planes to be encoded when using the table 0 as calculated above, and the amount of data in each sub band.

5 (bit planes for 2*LL*)×1 (data unit in 2*LL*)+4 (bit planes for 2*HL*)×1 (data unit in 2*HL*)+3 (bit planes for 2*LH*)×1 (data unit in 2*LH*)+2 (bit planes for 2*HH*)×1 (data unit in 2*HH*)+1 (bit planes for 1*HL*)×4 (data unit in 1*HL*)+3 (bit planes for 1*LH*)×4 (data unit in 1*LH*)+1 (bit planes for 1*HH*)×4 (data unit in 1*HH*)=34

The amount of data to be encoded in each of the cases for using the tables 1 through 7 of the table data in FIG. 8, can be obtained in a similar fashion to that described above. The numbers indicated in the column at the far right hand side in FIG. 12 ('amount of data to be encoded') represent these results.

For example, the calculations for obtaining the amount of data in the case where table 3 is used (corresponding to the example shown in FIG. 9), are shown below.

6 (bit planes for 2*LL*)×1 (data unit in 2*LL*)+5 (bit planes for 2*HL*)×1 (data unit in 2*HL*)+4 (bit planes for 2*LH*)×1 (data unit in 2*LH*)+3 (bit planes for 2*HH*)×1 (data unit in 2*HH*)+2 (bit planes for 1*HL*)×4 (data unit in 1*HL*)+4 (bit planes for 1*LH*)×4 (data unit in 1*LH*)+2 (bit planes for 1*HH*)×4 (data unit in 1*HH*)=50

The speed of the encoding processing of the arithmetic encoder (104) is determined by its circuit structure, and here, the required processing time of the arithmetic encoder for encoding the amount of data in a 32×32 pixels unit is denoted as X(ns). When it is required to process one image within a maximum time period of Y(ns), for example, the maximum amount of data that can be processed by the arithmetic encoder per unit-time is Y/X. Thus, if the encoding process is to be performed using the above tables 0 through 7, the table indicating the largest value for the above amount of data among the values that do not go beyond X/Y is selected for the encoding process, so that the processing time of the encoding process can be confined within the predetermined time period.

Also, in encoding an image which is divided into a plurality of tiles, a similar process may be performed on each of the tiles so as to realize an encoding process guaranteeing a maximum processing time, identical to that described above.

In this way, by using the table data and making small adjustments to the control method (i.e. the selecting of a table (set) included in the table data of FIG. 8), the amount of data to be generated from the encoding process can easily be controlled and a maximum processing time for encoding an image can be guaranteed, both at the same time.

Additionally, the table data such as that illustrated in FIG. 8 are able to limit the degradation of the image quality of the resulting image upon its decoding with respect to the required compression rate. This is done by determining the bit plane to be discarded so that the ones which are least likely to influence the image quality upon decoding the image will be selected in due order.

Further, in another aspect of the present invention, a circuit for performing an operation of selecting a desired table from the table data such as that illustrated in FIG. 8 is implemented on an IC such as the LSI. Such an IC is applicable in such apparatuses as the digital still camera by being embedded into the apparatus so as to be utilized in compressing a photographed image and storing it into a storage medium. Alternatively, the above operation may be implemented in a computer in the form of a software program or firmware, which can be installed/embedded into a digital camera and the like. Also, the above software program or firmware may be implemented in the form of a computer-readable storage medium such as a CD-ROM having table data such as that illustrated in FIG. 8 stored within.

As described above, in the present invention, the amount of codes generated from the encoding process is controlled using table data. In this way, the required compression rate can easily be achieved without a delay in the processing, even for an encoding process requiring high speed.

Also, due to the fact that the amount of data to be encoded is controlled using table data, the processing time required for the encoding process may also be controlled, thus enabling a real time encoding process even in an encoding process for moving images and the like.

Further, the above control of the code quantity and the guarantee of the required processing time may be achieved simultaneously with accuracy and ease.

What is claimed is:

1. An encoding device that represents image data in the form of a plurality of bit planes for each of a plurality of sub bands and encodes said image data for each bit plane, comprising:
a plurality of tables with respective sets of table data, wherein each set of table data is associated with a corresponding compression rate and amount of data to be encoded and specifies a corresponding subset of either the bit plane(s) to be discarded or the bit plane(s) to be encoded for each sub band; and
an encoding part configured to encode a predetermined amount of data in an amount X of time and select a set of table data, corresponding to one of said plurality of tables, based on a maximum required processing time Y,
wherein said maximum required processing time is an amount of time within which processing by said encoding device of said image data is required to be completed,
wherein said encoding part selects the set of table data corresponding to the table that is associated with the largest amount of data to be encoded amongst tables associated with amounts of data to be encoded that do not exceed a ratio Y/X.

2. The encoding device as claimed in claim 1, wherein in said sets of table data, the number of bit planes to be discarded increase as the frequency of the corresponding sub band increases.

3. The encoding device as claimed in claim 1, wherein an entropy process is performed on the bit plane(s) specified by the selected set of table data.

4. The encoding device as claimed in claim 1, wherein a number of coding passes is determined from the selected set of table data.

5. The encoding device as claimed in claim 1, wherein said image data comprise coefficient data obtained from a two dimensional discrete wavelet transformation.

6. The encoding device as claimed in claim 1, wherein the selected set of table data specifies the bit plane(s) to be discarded for each sub band.

7. The encoding device as claimed in claim 1, wherein the selected set of table data specifies the bit plane(s) to be encoded for each sub band.

8. The encoding device as claimed in claim 1, wherein said plurality of tables are associated with respective code quantities.

9. The encoding device as claimed in claim 1, wherein said plurality of tables are associated with respective amounts of data to be encoded.

10. The encoding device as claimed in claim 1, wherein said plurality of tables are associated with respective required processing times.

11. An encoding method, performed by an encoding device, for representing image data in the form of a plurality of bit planes for each of a plurality of sub bands and encoding said image data for each bit plane comprising:
  storing a plurality of tables with respective sets of table data, wherein each set of table data is associated with a corresponding compression rate and amount of data to be encoded and specifies a corresponding subset of the bit plane(s) to be discarded or the bit plane(s) to be encoded for each sub band;
  selecting by an encoding device configured to encode a predetermined amount of data in an amount X of time, and based on a maximum required processing time Y, a set of table data corresponding to one of said plurality of tables,
  wherein said encoding device selects the set of table data corresponding to the table that is associated with the largest amount of data to be encoded amongst tables associated with amounts of data to be encoded that do not exceed a ratio Y/X; and
  using the selected set of table data to determine either the bit plane(s) to be discarded or the bit plane(s) to be encoded for each sub band,
  wherein said maximum required processing time is an amount of time within which processing by said encoding method is required to be completed.

12. The encoding method as claimed in claim 11, wherein in said sets of table data, the number of bit planes to be discarded increase as the frequency of the corresponding sub band increases.

13. The encoding method as claimed in claim 11, further comprising determining a number of coding passes based on the selected set of table data.

14. The encoding method as claimed in claim 11, wherein said image data comprise coefficient data obtained from a two dimensional discrete wavelet transformation.

15. The encoding method as claimed in claim 11, wherein the selected set of table data is utilized to determine the bit plane(s) to be discarded for each sub band.

16. The encoding method as claimed in claim 11, wherein the selected set of table data is utilized to determine the bit plane(s) to be encoded for each sub band.

17. A computer readable medium tangibly embodying a program of instructions executable by a computer to perform a process for representing image data in the form of a plurality of bit planes for each of a plurality of sub bands and encoding said image data for each bit plane, said process comprising:
  storing a plurality of tables with respective sets of table data, wherein each set of table data is associated with a corresponding compression rate and specifies a corresponding subset of the bit plane(s) to be discarded or the bit plane(s) to be encoded for each sub band;
  selecting by an encoding device configured to encode a predetermined amount of data in an amount X of time, and based on a maximum required processing time Y, a set of table data corresponding to one of said plurality of tables,
  wherein said encoding device selects the set of table data corresponding to the table that is associated with the largest amount of data to be encoded amongst tables associated with amounts of data to be encoded that do not exceed a ratio Y/X; and
  using the selected set of table data to determine either the bit plane(s) to be discarded or the bit plane(s) to be encoded for each sub band,
  wherein said maximum required processing time is an amount of time within which processing by said process is required to be completed.

* * * * *